Feb. 27, 1962 R. A. LEE ETAL 3,022,691
WIRE CASE CARRIER FOR A SCREW MACHINE
Filed Feb. 19, 1959
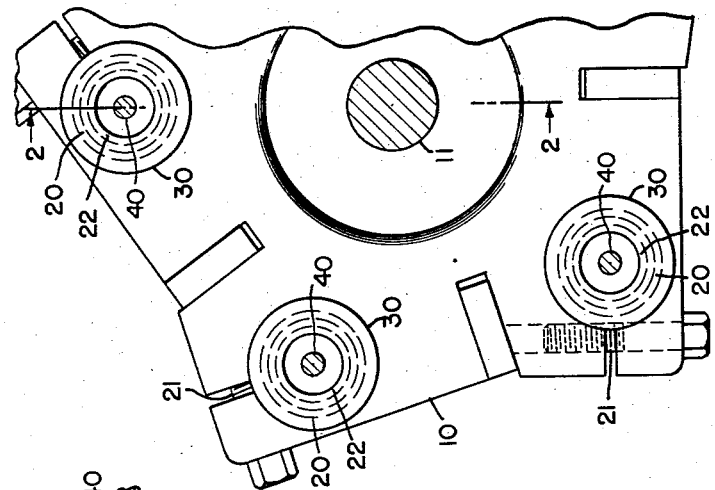
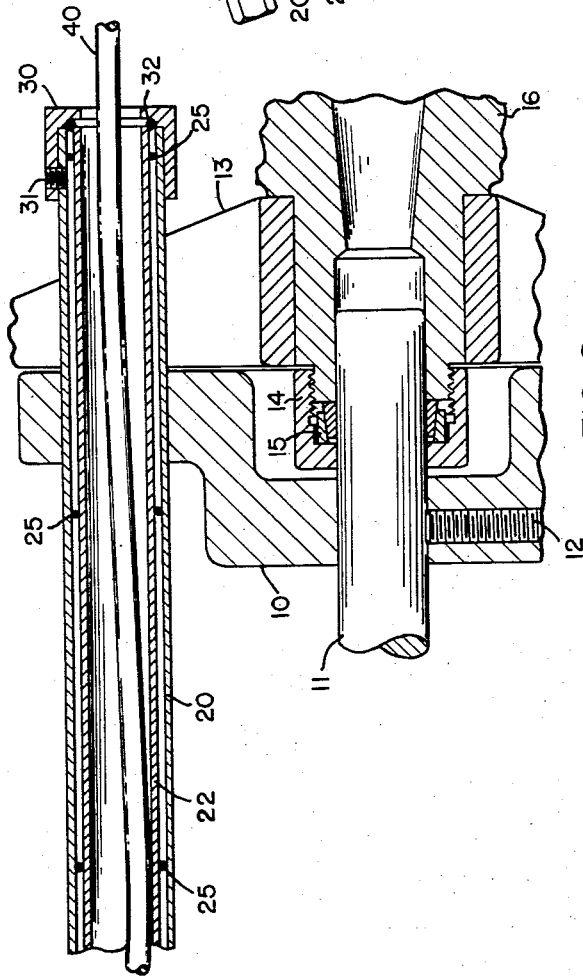
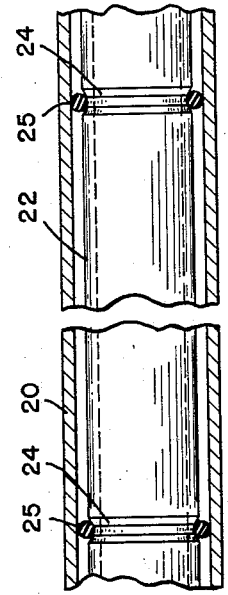
INVENTORS
ROBERT A. LEE AND
EARL W. BRINKMAN
BY
Attorney

United States Patent Office 3,022,691
Patented Feb. 27, 1962

3,022,691
WIRE CASE CARRIER FOR A SCREW MACHINE
Robert A. Lee and Earl W. Brinkman, Rochester, N.Y., assignors to Davenport Machine Tool Company, Inc., Rochester, N.Y., a corporation of New York
Filed Feb. 19, 1959, Ser. No. 794,361
2 Claims. (Cl. 82—38)

The present invention relates to screw machines, and more particularly to an improved construction for the wire case carriers of a screw machine.

Multiple spindle automatic screw machines are provided to perform a plurality of operations, such as drilling, threading, reaming, knurling, and slotting on workpieces that are cut off, usually at the end of the operations, from rotating bars of stock. At each of the operating stations one or more of these operations are performed on the bar of stock which is fed to the work spindle at that station. Thus, several workpieces are being operated on simultaneously.

The lengths of bar stock, which extend outside of the screw machine proper, are supported by a wire case carrier. The conventional wire case carrier comprises one or more elongate cylindrical carrier tubes which are supported in angularly spaced relation by a plurality of axially-spaced supporting plates. The lengths of bar stock are fed through their respective carrier tubes to collet chucks which hold them during operation thereon. The stock is rotated at high speed, at times even at speeds in excess of five thousand revolutions per minute. Inasmuch as it is not practical to change the carrier tubes for each diameter of bar stock, it is customary to make the diameter of the carrier tubes somewhat larger than the largest diameter of stock to be operated on by the machine. The bars of stock are held, of course, only at their forward ends by the collets. Hence, the unsupported portions of the bars rotating at high speed tend to whip around within the hollow metallic carrier tubes. They continually hit the sides of the tubes with great rapidity, and may also frictionally engage and rub on the interior surfaces of the tubes. The noise produced by this hitting and rubbing is amplified by the hollow carrier tubes and by the other portions of the machine in contact therewith. The tremendous noise caused by the rotating bar stock in its carrier tube is such that it is only with extreme difficulty that a person standing next to an operating screw machine and talking in his loudest tone of voice can be heard by another standing next to him. This tremendous noise not only causes the operator to suffer nervous fatigue but also decreases his efficiency.

In addition to this, in some instances, where the screw machine is required to operate on a piece of bar stock which has an outside diameter almost equal to the inside diameter of its carrier tube, if the bar stock should be slightly bent a frictional drag is produced between the bar stock and the inner surface of its carrier tube. This may cause the stock to bind in the tube and/or put a strain on the feeding and chucking apparatus.

In view of the above, one of the objects of this invention is to provide an improved wire case carrier for screw machines which reduces to a minimum the amount of noise resulting from vibration and pounding of the long unsupported portions of the bars of stock.

Another object of this invention is to provide an improved sound absorption means for wire case carriers for screw machines which can be installed on the wire case carriers presently in use.

A still further object of this invention is to provide an improved wire case carrier for screw machines which decreases the frictional drag of a crooked or bent piece of bar stock in its individual carrier tube during operation.

Other objects of this invention will be apparent from the accompanying drawing, the specification, and the appended claims.

In the drawing:

FIG. 1 is a fragmentary front elevation of the front supporting plate and associated parts of a wire case carrier built according to one embodiment of this invention;

FIG. 2 is a fragmentary cross sectional view taken at line 2—2 of FIG. 1 through the wire case carrier and also showing fragmentarily and in section adjoining parts of the screw machine; and FIG. 3 is an axial sectional view further showing how the interior of a carrier tube of this invention is mounted within an outer tube.

Referring to FIG. 1, 10 denotes a front support plate, which is adapted to support five individual carrier tubes 20. The drawing shows only the front supporting plate of the carrier, that is, the one nearest the working portion of the machine, but two or more supports similar to the support 10 and spaced axially therefrom, are provided as in conventional wire case carriers to form the completed wire case carrier assembly. The supporting plates are aligned and rigidly secured to each other in spaced relationship by a rod 11, which extends through the center of each supporting plate, and is secured thereto by means of set screws 12. To secure the entire wire case carrier assembly in operating position on the screw machine the rod 11 is fastened to the supporting portion 16 of the screw machine by means of nut 14 which is threaded on the rear end of the supporting portion 16 and which forces clamping rings 15 into engagement with the rod 11. 13 denotes merely a conventional spider forming part of the screw machine.

A plurality of carrier tubes 20 extend through the supporting plate 10 and are rigidly held in position in split clamps formed in the plate 10 by clamping bolts 21. In each of the tubes 20 there is mounted coaxially a metallic inner tube 22. The inner tube 22 is provided on its periphery with a plurality of axially-spaced grooves 24. Mounted in the grooves 24 and interposed between the inner tube 22 and the carrier tube 20 are a plurality of O-rings 25. Although any type of resilient rubber-like material can be used, the O-rings 25 are preferably made of a neoprene material. A metallic cap 30 fits over the end of each tube 20 and is secured in place by means of a set screw 31. An O-ring 32, similar to O-rings 25, is interposed between the edge of the associated inner tube 22 and the opposed surface of the end cap 30. The end caps 30 hold the tubes 20 and 22 in position relative to one another. They also serve to prevent the bar stock from carrying the inner tubes 22 along as the bar stock is fed to the machine.

In operation, the bar stock 40 is fed through each inner tube 22, as shown in FIG. 2, to the collet chucks (not shown) of the machine. Even though the long length of bar stock 40 rotates at high speed within an inner tube 22, and may hit the inner surface of the tube 22 with great force and rapidity, the noise vibrations which are set up in the inner tube 22 are prevented from being transmitted to the associated carrier tube 20, the supporting plate 10, and to the screw machine by the plurality of O-rings 25. The end rings 32 prevent the noise vibrations from being transmitted from an inner tube 22 through the end caps 30 to the outer carrier tubes 20. The sound vibrations are absorbed and damped by the plurality of O-rings and by the air gap between the members 22 and 20.

The grooves 24 not only serve to support the spaced neoprene O-rings but also serve to more efficiently damp out the sound vibrations set up in the inner tube 22 by varying the thickness of the inner tube at spaced positions along its length and by causing more of the inner tube area to engage each of the resilient O-rings.

In the event that a piece of bar stock which has been fed into an inner tube 22 should be slightly deformed or bent, the rotating stock would cause the resilient mountings 25 to yield during operation, thereby decreasing the frictional drag of the rotating bar stock.

In the actual operation of a screw machine provided with a wire carrier built according to this invention, the noise produced was reduced by approximately 90% so that quietude heretofore unknown in the operation of this type of machine is achieved. Thus, it is apparent that we have provided an improved means for absorbing and damping the vibration and sound in a screw machine at their source. Also, as the vibrations causing the noise not only begin and extend throughout the length of the bar stock so do the means for absorbing or damping these vibrations extend throughout the length of the carrier tube.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features whereinbefore set forth, and as fall within the scope of the invention or the limits of the appended claims.

Having thus described our invention, what we claim is:

1. A wire case carrier for a screw machine, comprising an outer cylindrical tube, an inner cylindrical tube coaxially mounted in said outer tube and through which bar stock may be fed, said inner tube having a smaller outside diameter than the inside diameter of said outer tube to provide an air space therebetween, said inner tube having a plurality of axially-spaced peripheral grooves in it along its length so that it is of reduced thickness and outside diameter at spaced intervals intermediate its ends along its length, an elastic ring mounted in each of said grooves and interposed between said inner and outer tubes to support said inner tube within and from said outer tube, said inner tube being supported from said outer tube solely by said rings.

2. A wire case carrier according to claim 1 wherein a metallic cap is fastened over one end of the outer tube to extend in front of the adjacent end of said inner tube, said cap having an opening therethrough which is aligned axially with the bore of said inner tube and the diameter of which is at least as great as the inside diameter of said inner tube, and an elastic ring interposed between said one end of the inner tube and said cap to limit axial movement of said inner tube relative to said outer tube without contact between said inner tube and said cap.

References Cited in the file of this patent

UNITED STATES PATENTS

| | | |
|---|---|---|
| 1,506,107 | Brophy | Aug. 26, 1924 |
| 1,904,329 | Rich | Apr. 18, 1933 |
| 2,534,811 | Corlett | Dec. 19, 1950 |
| 2,855,815 | Miller | Oct. 14, 1958 |

FOREIGN PATENTS

| | | |
|---|---|---|
| 630,341 | Great Britain | Oct. 11, 1949 |
| 247,059 | Switzerland | Nov. 17, 1947 |